(No Model.)
S. BAKER.
CAR STARTER.
No. 353,345. Patented Nov. 30, 1886.
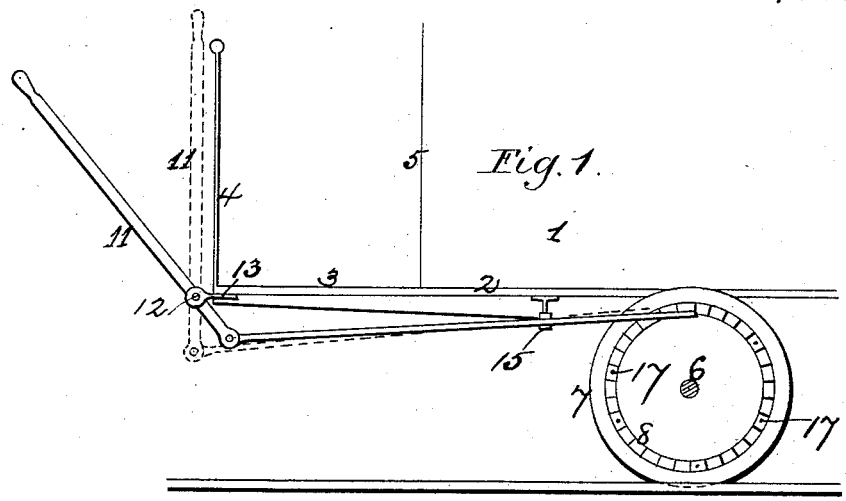
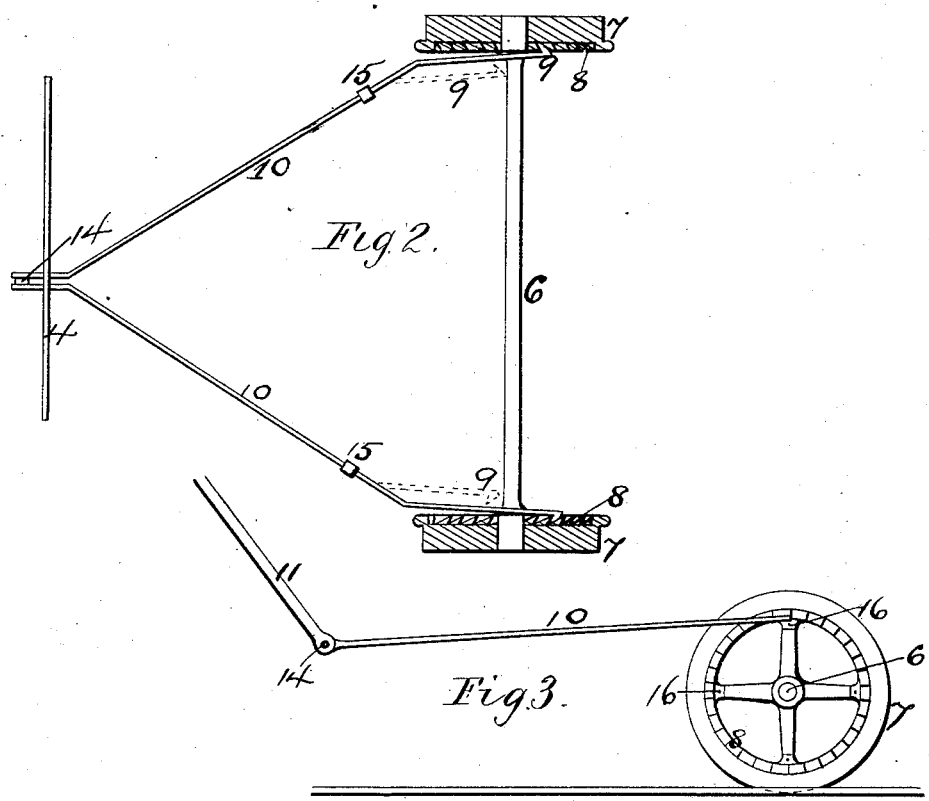
Witnesses:
B. C. Fenwick
Henry Gardner Jr
Inventor:
Simeon Baker
By Chas J. Gooch
his Attorney

UNITED STATES PATENT OFFICE.

SIMEON BAKER, OF SAN JOSÉ, CALIFORNIA, ASSIGNOR OF ONE-HALF TO BYRON J. RHODES, OF SAME PLACE.

CAR-STARTER.

SPECIFICATION forming part of Letters Patent No. 353,345, dated November 30, 1886.

Application filed April 14, 1886. Serial No. 198,821. (No model.)

*To all whom it may concern:*

Be it known that I, SIMEON BAKER, a citizen of the United States, residing at San José, in the county of Santa Clara and State of California, have invented a certain new and useful Device for Starting Railway-Cars or other Vehicles in Motion, of which the following is a specification, reference being had therein to the accompanying drawings.

This improved car-starter consists, essentially, of circular-shaped toothed disks or rings attached to the inner faces of the front wheels of a vehicle, a pair of outwardly-extending rods supported and sliding in sockets or bearings depending from the bottom of the vehicle-body and having hook-shaped rear ends to engage with the toothed disks on the wheels, and a hand-operating lever having pivotal bearing in a plate or block attached to the vehicle body or platform and connected at its bottom to the front ends of the disk-engaging rods, all as hereinafter described.

In the accompanying drawings, Figure 1 represents a medial longitudinal section of the fore part of a vehicle-platform with one of the front wheels and my improvements in side elevation. Fig. 2 represents a top plan view of the front axle and wheels and the starting mechanism. Fig. 3 represents an inner side elevation of one of the drive-wheels, showing one mode of connecting the toothed disk thereto.

1 represents the body of any suitable vehicle—such, for instance, as a street-car. 2 is the platform or floor thereof; 3, the driver's platform; 4, the dash-board; 5, the front end of the car; 6, the fore axle, and 7 the fore wheels.

8 represents a ratchet-toothed ring or disk, which is attached one to the inner face of each fore wheel, either by riveting, bolting, or otherwise connecting the same to the web or flanges, as shown in Figs. 1 and 2, or by clamping the same to the spokes of a vehicle-wheel, as represented in Fig. 3. The points of the ratchet-teeth extend rearwardly, as shown, so as to afford sufficient and secure gripping-surface for the rear hooked ends, 9, of the rods 10. These rods are at their forward ends connected to the lower ends of the operative lever 11, which has pivotal bearing at 12 in a lug or plate, 13, attached to the fore end of the platform.

The starter-rods are constructed of any suitable metal—such as steel—and are of angular form, as shown, so as when connected together and to the lower end of the operative lever at their fore ends by a bolt or pin, 14, to represent in plan view the form of a V, by which construction they are enabled to extend outwardly from the operative lever to each of the fore wheels. The hook or dog 9 on the inner end of each of the starter-rods 10 may either be formed integrally with or separately from the rods, and may either be rigid therewith, as shown, or hinged thereto. The extreme inner end of each rod carrying said dog or hook, extends at a decreased angularity, so as to enable it to act with greater effect upon the toothed disk than would be possible were it of greater angle.

15 represents sockets attached to and depending from the under side of the platform or frame of the vehicle, within which the rods slide when in operation, and rest and are supported when said rods are not in use.

16 represents the clamps by which the toothed ring 8 is secured to the spokes, as represented in Fig. 3.

17 represents the rivets by which said ring is secured to the webs or flanges of the wheels, as represented in Fig. 1. The operation of my improved car-starter is very simple and can be instantaneously accomplished. All that is necessary to secure the starting of the vehicle is to push forward the lever 11, as represented in full lines, Fig. 1, whereupon the starter-rods will be pushed rearwardly and the hooks or dogs 9 thereon forced into engagement with the teeth on the disk or ring 8. The upper end of the lever 11 is then drawn rearwardly, as shown in dotted lines, which action causes the lower end of said lever to draw forward the rods 10 and draw forward and around the fore wheels, and consequently start the vehicle. As soon as the wheels have made a partial revolution, the dogs or hooks on the rods 10 are automatically released from engagement with the toothed disks, and the lever and rods connected thereto are free to be operated, as before.

Having thus described my invention, what I claim is—

1. A car-starter consisting of a pair of toothed disks secured to the interior faces of the fore wheels, hooked rods supported in suitable bearings depending from the vehicle, and a lever connected to said rods, and having pivotal bearing to permit of the reciprocation of said rod upon said lever being rocked in its bearing, substantially as and for the purpose set forth.

2. A car-starter having a pair of toothed disks secured to the inner faces of the fore wheels, a pair of angular starter-rods having hooked ends adapted to engage with the teeth on said disks, sockets depending from the vehicle within which said rods rest and longitudinally reciprocate, and an operative lever having pivotal bearing in a suitable support attached to the vehicle, near its lower end, and coupled at its lower end to said starter-rods, as and for the purpose set forth.

In testimony whereof I affix my signature in presence of two witnesses.

SIMEON BAKER.

Witnesses:
C. E. RUSSELL,
D. J. STANSBURY.